Jan. 30, 1945.  G. A. LYON  2,368,235
WHEEL STRUCTURE
Filed Dec. 29, 1941  2 Sheets-Sheet 2
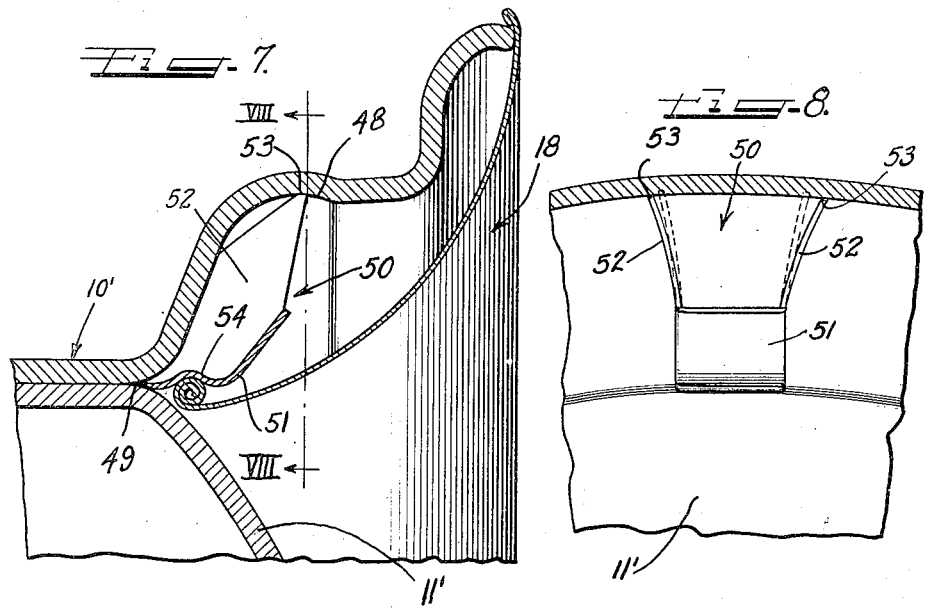
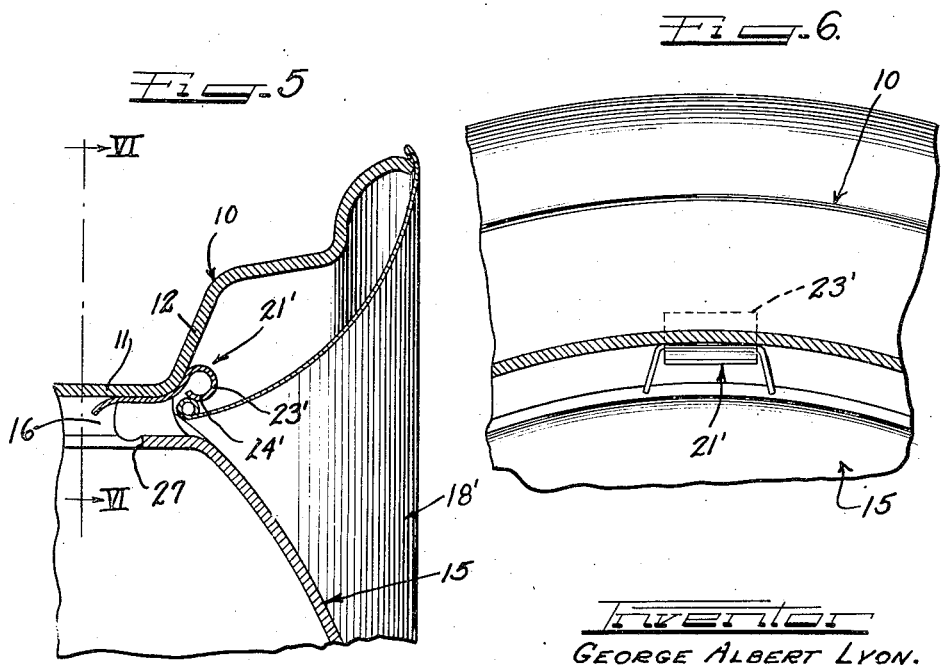
Inventor
GEORGE ALBERT LYON.

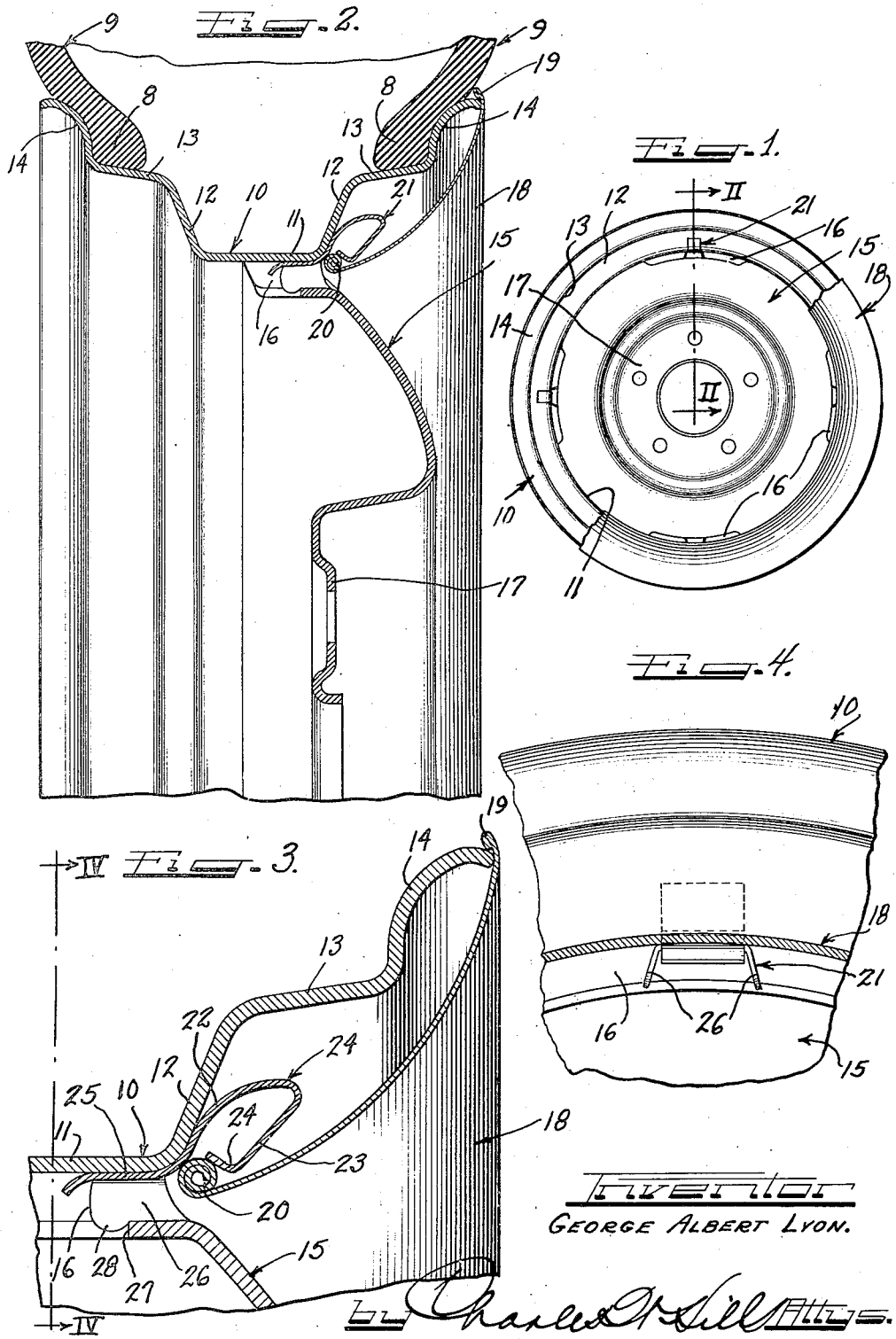

Patented Jan. 30, 1945

2,368,235

UNITED STATES PATENT OFFICE 2,368,235

WHEEL STRUCTURE

George Albert Lyon, Allenhurst, N. J.

Application December 29, 1941, Serial No. 424,683

9 Claims. (Cl. 41—10)

This invention relates to a wheel structure, and more particularly to novel spring clip retaining means for cooperation in a unique manner with the parts of a wheel and with a wheel cover or trim ring.

An object of this invention is to provide improved spring clip means adapted to be self-retained on a wheel solely by reason of their resilient gripping engagement of parts of the wheel.

Another object of this invention is to retain a trim ring or wheel cover on a wheel by simplified and inexpensive means, which is self-retained on the wheel, and which is always available for immediate and efficient retaining cooperation with a shoulder on a trim ring or wheel cover.

In accordance with the general features of this invention, there is provided in a wheel structure, including a multi-flanged tire rim part and a body part joined thereto, spring clip means for holding a wheel cover member on the wheel comprising a plurality of spaced clips each including a metallic strip having portions thereof arranged for a snap-on, retaining engagement with the wheel parts, certain of which portions are adapted to be spread relative to each other in the application of the clip to the wheel, so that they are thereafter under stress and in engagement with the corresponding part of the wheel.

In accordance with other features of the invention, there are provided certain forms or modifications of the invention wherein the clip means is resiliently wedged in wheel openings between the wheel parts and adjacent the junction of the wheel parts.

Other objects and features of this invention will more fully appear from the following detailed description taken in connection with the accompanying drawings which illustrate several embodiments thereof, and in which:

Figure 1 is a side elevation of a wheel structure embodying the features of this invention and partly broken away to show the spacing of the spring clips which may be four in number;

Figure 2 is an enlarged fragmentary cross sectional view taken on the line II—II of Figure 1 looking in the direction indicated by the arrows;

Figure 3 is a fragmentary enlarged cross sectional view corresponding to the upper right hand portion of Figure 2;

Figure 4 is a fragmentary front detailed view partly in section showing the front configuration of one of the spring clips and taken on the line IV—IV of Figure 3;

Figure 5 is a fragmentary sectional view corresponding to Figure 3 illustrating a modification of the invention;

Figure 6 is a fragmentary sectional view taken on the line VI—VI of Figure 5 looking in the direction indicated by the arrows;

Figure 7 is a fragmentary cross sectional view similar to Figures 3 and 5 illustrating a further modification of the invention; and Figure 8 is a fragmentary cross sectional view taken on the line VIII—VIII of Figure 7 looking in the direction indicated by the arrows.

As shown on the drawings:

The reference character 10 designates generally a multi-flanged drop center type of tire rim which is of a well known construction. This constitutes one part of the wheel, the other part being the body part or spider designated generally by the reference character 15.

The rim part 10 is adapted to accommodate in the usual way a pneumatic tire 9 having beads 8—8 seated in the flanges of the rim part. The rim part includes the usual flanges, namely, a base flange 11, radial side flanges 12 and 14, and generally axial flanges 13, on which latter flanges the beads 8 are seated.

The base flange 11 of the rim part is connected at spaced intervals by any suitable means in the usual way to the wheel body part or spider 15; there being wheel openings 16 between the joined portions of the body and rim parts. I propose, in accordance with the features of this invention, to utilize these openings in the retention of my novel spring clips designated generally by the reference character 21 on the wheel.

The openings may be four in number, in which event four spring clips 21 embodying my invention may be used.

The wheel body part or spider 15 also includes the usual central bolt-on flange 17 by means of which the wheel may be attached in the usual way to any suitable support on the wheel.

The spring clips 21 are adapted to be self-retained on the wheel and to serve the purpose of detachably retaining a wheel cover or trim member designated generally by the reference character 18 on the wheel. This trim member is annular in shape and may be made of any suitable thin metallic sheet. The outer edge of the trim member or ring 18 is turned back upon itself as indicated at 19 and is disposed over the outermost edge of the adjacent flange 14 of the rim part. In other words, this turned edge 19 extends beyond the rim part and overhangs the same alongside of the outer side wall of the tire 9.

The ring is of a convex-concave cross sectional shape which is predetermined so that it will have the appearance of being a continuation of the side wall of the tire. For illustration, if this ring 18 has its outer surface finished in white, it gives the appearance of constituting a part of the side of the tire. In other words, it causes the tire to appear to have a white side wall.

The innermost extremity of the ring or its inner edge is turned a plurality of times upon itself so as to form a multi-thickness bead 20. This bead reinforces the trim ring at its point of cooperation with the spring clips and also at the place where a pry-off tool is inserted to engage the ring when it is to be removed from the wheel. By using a plurality of thicknesses in the bead 20, which is effected by curling the edge upon itself several times as clearly shown in Figure 3, I am enabled to use much thinner metal in the ring than I would otherwise be able to use. The reason for this is that this turning of the edge or margin of the ring upon itself a plurality of times rigidifies this edge, so that it has the proper strength to stand up against buckling in the application and removal of the ring. In addition thereto, the rigidity given to this edge does not detract from its effectiveness in being snapped or pressed over the cooperating portions of the spring clips. The subject matter of this reinforcing of the edge of the trim ring or wheel cover is being covered broadly in my United States Letters Patent No. 2,308,615, issued June 19, 1943.

It should also be noted that due to the fact that the inner edge of the trim ring has a relatively large diameter, inasmuch as the ring is wholly disposed over the rim part of the wheel, this edge tends to have considerable flexing in use and might easily be buckled if it is not properly reinforced. I find that I am enabled to obtain this reinforcement by the multiple thickness bead 20 described above.

The spring clips 21 are all identical in construction, and hence a description of one will suffice for all. Each of them is made of suitable spring steel having the requisite resilient characteristics and embodies a main strip or body portion 22, one extremity of which is turned back upon itself at 23 to provide a resilient angular shoulder or edge portion 24 over and behind which the beaded edge 20 of the trim ring is adapted to ride in the application of the cover to the wheel. It is by reason of the fact that the beaded edge 20 is disposed behind and outwardly of the radially innermost portion of the bent edge 24 that the cover or trim ring 18 is retained under tension on the wheel.

The other extremity of the strip 22 is bent in an opposite direction from that of the first mentioned extremity and is curved so that it will extend axially inside of one of the wheel openings 16. This axially extending bent portion of the clip is designated by the reference character 25. Integral with and extending generally radially inwardly from this portion 25 are a pair of spaced ears 26—26, which are slightly inclined as shown in Figure 4 so as to diverge from each other toward the center of the wheel when in engaged positions. Each of these ears has an extremity adapted to grip or bite an edge 27 of the wheel body 15 inside of the opening 16. I have designated each of the gripping or engaging portions of the ears 26 by the reference character 28 in Figure 3. It will be noted that this portion 28 extends further radially inwardly than the remaining portion of the ear, so that it can overhang the edge 27 of the wheel body 15 and thus effectively grip the edge and hold the clip in place.

Moreover, due to the fact that the ears 26 are resilient and movable relative to each other, they will tend to spread when being pushed into the wheel opening until the portions 28 thereof have passed over and behind the curved edge 27 of the wheel body. At this time these ears will tend to spring back toward their normal positions and thus have a tensioned engagement with the edge 27. In other words, these ears 26 do not resume completely their normal positions, so that they are under tension when in engagement with the curved edge 27.

Another advantage of using the spaced ears 26 for the retention of the clip 21 in position is that the spacing between the ears can be utilized to enable a skid chain strap to be passed through the clip and through the wheel opening in the attachment of the skid or lug chain to the wheel in a manner well known to those familiar with this art.

In Figures 5 and 6 showing a modification of the invention, I have used the same reference numerals to designate parts of the wheel corresponding to and identical with the parts described in the first form of the invention. This modification of the invention is substantially the same as that previously described, with the exception that the spring clip 21' is of a slightly different construction. Instead of having a large bend or gooseneck on the outer extremity of the clip, I provide a short loop 23' in this clip 21'. The inner edge 24' of this short loop is adapted to cooperate with the beaded edge of the trim ring 18' in substantially the same way as in the preferred form of the invention.

In both of the above described forms of my invention, the clip is applied to the wheel by pressing it axially into one of the wheel openings 16 until the enlarged portions of the clip ears pass over and behind the edge 27 of the wheel body or spider 15. Further inward movement of the clip is prevented by the looped outer extremity abutting the side flange 12 of the rim part 10. Removal of the clip may be effected by suitably prying it out of the cooperating wheel spider opening.

The wheel cover member 18—18' is applied to the wheel by pressing it axially into retained cooperation with the free looped extremities of the spring clips. Removal of the cover member may be effected by inserting the edge of a pry-off tool under the beaded inner edge of the cover and forcibly prying it out of cooperation with the spring clips. It should be noted that the cover member goes on easy but requires more force to remove it, and hence it is not likely to come off in the use of the wheel.

In Figures 7 and 8, I have illustrated still a third form of cover member retaining clip 50 for holding the cover or trim ring 18 on the wheel which includes a rim part 10' and a body part 11'.

The clip 50, unlike the other forms of clips, does not extend into a wheel opening but instead is resiliently wedged between a shoulder 48 in the rim part and a junction portion 49 of the two wheel parts.

The clip 50, like the other clips, is made from suitable resilient strip metal or steel. It includes a body portion 51 having a radially inner extremity arranged to engage wedgingly at 49 in the junction of the two wheel parts. It also includes outwardly radially projecting spaced ears 52—52 having extremities 53—53 for biting engagement with the inner side of the annular shoulder 48 of the rim part. These ears function in the same manner as the ones on the previously described clips and are adapted to pass over and behind the high spot of the shoulder 48. The dotted lines in Figure 8, together with the full lines, show how the ears 52—52 are flexed or cammed apart in the application of the clip to the rim part.

The body portion 51 has a depressed portion 54 for defining a shoulder in the body portion over and behind which the inner beaded edge of the cover 18 is adapted to be snapped into retained cooperation with the clip. The clip is applied to the wheel by pressing it axially into cooperation with the rim and body parts and may be removed by a pry-off tool.

I claim as my invention:

1. In a wheel construction including a multi-flanged tire rim part including inclined radial side flanges and a body part joined thereto, spring clip means for holding a wheel cover member on the wheel comprising a plurality of spaced clips each including spaced ears adapted to be spread apart in the pressing of the clip into cooperation with the parts of the wheel and thereafter to be under tension by reason of the tendency of these ears to want to return to their normal positions and thus to hold the clip on the wheel and against rotation, each clip also including a radially outer portion bearing against a radial side flange of the rim part so as to be backed up thereby and which portion is retainingly cooperable with the cover member.

2. In a wheel construction including a multi-flanged tire rim part including inclined radial side flanges and a body part joined thereto, spring clip means for holding a wheel cover member on the wheel comprising a plurality of spaced clips each including spaced ears adapted to be spread apart in the pressing of the clip into cooperation with the parts of the wheel and thereafter to be under tension by reason of the tendency of these ears to want to return to their normal positions and thus to hold the clip on the wheel and against rotation, each of said clips also including a turned portion formed into a shoulder arranged so that an edge of a wheel cover may be passed thereover and behind the shoulder for retention of the wheel cover member on the wheel, said portion bearing on a radial side flange of the rim part so as to be backed up thereby.

3. In a wheel structure including a wheel including a multi-flanged wheel rim part including inclined radial side flanges and a body part joined thereto, a wheel cover retaining spring clip disposed alongside of a side flange of the rim part and having a pair of spaced ears movable relative to each other so as to spread apart upon being cammed against a portion of the wheel whereby these ears are thereafter under tension sufficient to retain the clip on the wheel, said ears bearing against a radial side flange of the rim part so as to be backed up thereby.

4. In a wheel structure including a wheel including a multi-flanged wheel rim part and a body part joined thereto at spaced intervals leaving wheel openings between the joined portions, wheel cover retaining spring clips disposed in said openings each having ears arranged to be spread apart upon being pressed against the parts of the wheel and when being passed into one of the wheel openings and thereafter to engage behind a portion of the body part in said opening, said engagement constituting the sole means for holding the clip on the wheel in a position to be engaged retainingly by a detachable wheel cover.

5. As an article of manufacture, a wheel cover retaining clip comprising a main body portion and spaced resilient ears projecting from said body portion and arranged to be spread apart upon being pressed against a portion of the wheel so as thereafter to be under tension for exerting a clip retaining and supporting pressure against the wheel, said body portion also having a resilient shoulder portion for retaining cooperation with a wheel cover.

6. As an article of manufacture, a wheel cover retaining clip comprising a main body portion and spaced resilient ears projecting from said body portion and arranged to be spread apart upon being pressed against a portion of the wheel so as thereafter to be under tension for exerting a clip retaining and supporting pressure against the wheel, each of said clips having an extremity radially remote from the ends of said ears and arranged to pass over and behind a shoulder on a wheel cover when such cover is pressed axially against the clips supported by the wheel.

7. As an article of manufacture, a wheel cover retaining clip comprising a main body portion and spaced resilient ears projecting from said body portion and arranged to be spread apart upon being pressed against a portion of the wheel so as thereafter to be under tension for exerting a clip retaining and supporting pressure against the wheel, said body portion having a depressed section defining a shoulder over and behind which an edge of a wheel cover is adapted to be pressed into detachable snap-on retained cooperation with said depressed section.

8. In a wheel structure including a wheel having integral radially spaced portions, and a wheel rim retaining clip including a backing portion formed to bear against one of said wheel portions, and a pair of spaced ears projecting substantially radially therefrom with their extremities positioned to be spread apart upon contacting another of said wheel portions to attach wedgingly the clip to the wheel solely by reason of such clip being pressed axially against the wheel.

9. In a wheel structure including a wheel having integral radially spaced portions, a wheel rim retaining clip including a backing portion formed to bear against one of said wheel portions, and a pair of spaced ears projecting substantially radially therefrom with their extremities positioned to be spread apart upon contacting another of said wheel portions to attach wedgingly the clip to the wheel solely by reason of such clip being pressed axially against the wheel, and a circular wheel trim including an annular edge, said backing portion also having shoulder means arranged in a circle such that said edge of the wheel trim may be cammed over and behind the same.

GEORGE ALBERT LYON.